United States Patent [19]

van Linden et al.

[11] Patent Number: 4,772,320
[45] Date of Patent: Sep. 20, 1988

[54] METAL RECOVERY FROM DROSS

[75] Inventors: Jan H. L. van Linden, Allison Park; David I. Yun, Murrysville; Gerald E. Carkin, Tarentum, all of Pa.

[73] Assignee: Aluminum Company of America, Pittsburgh, Pa.

[21] Appl. No.: 31,282

[22] Filed: Mar. 30, 1987

[51] Int. Cl.⁴ .............................................. C22B 21/00
[52] U.S. Cl. ...................................... 75/68 R; 75/24; 266/227
[58] Field of Search .................. 75/24, 68 R; 266/227

[56] References Cited

U.S. PATENT DOCUMENTS 4,604,136  8/1986  Bergkvist ................................ 75/24

Primary Examiner—Peter D. Rosenberg
Attorney, Agent, or Firm—Bruce J. Ffitch

[57] ABSTRACT

In a system for treating and managing hot aluminum dross, the dross is compacted and delivered by a pair of "squeeze" rolls in a continuous semi-solid sheet, readily broken up for further treatment or disposal. The rolls may be cooled or heated as required to condition the dross appropriately, for storage or immediate further treatment. Ribs on the rolls and/or a stepped "break" chute downstream of the rolls may be used to break the compacted dross into "patties" for convenient handling.

40 Claims, 2 Drawing Sheets

METAL RECOVERY FROM DROSS

BACKGROUND OF THE INVENTION

The invention concerns the recovery of metals such as aluminum from secondary sources. More specifically it concerns means for the recovery of aluminum from aluminum dross which forms on the surface of molten aluminum during melting operations.

In the course of conventional aluminum melting operations, oxides, nitrides and other non-metallic impurities accumulate on the surface of the molten metal. Prior to tapping the molten metal these non-metallics are removed or skimmed from the surface of the melt. Substantial quantities of aluminum metal will be unavoidably entrained and removed with the non-metallics. This mixture of non-metallics, free aluminum and aluminum alloy is termed aluminum dross or skim.

Dross typically contains from 30 to 90 percent free molten aluminum depending on the particular processing technique and type of furnace. The balance consists of a sponge-like network of solid particles containing aluminum oxide and various other oxides, nitrates and carbides which form during the melting operation by reacting with the ambient atmosphere. This network of solid particles will be referred to as the solids network.

The recovery of aluminum from secondary sources such as dross is desirable because the production of aluminum from its primary source, bauxite, is relatively expensive due to the high energy consumption involved. However, separation of the free metal from the non-metallic portion of the dross is generally difficult and efforts to devise cost effective methods of recovery continue. For example, U.S. patents of recent years disclose activity in several phases of dross management including: improved methods of metal separation from the cold solified dross; "conditioning" of the dross during its collection and cooling; and also direct or immediate metal recovery from the hot dross. Methods claiming an improvement in total recovery or separation may be a combination of two or more of these approaches.

For example, Cromwell (U.S. Pat. No. Re. 31,028) is directed to the cleaning and preparation of cold solidified dross by more effective removal of oxide coatings on the dross. The dross is sequentially fed through various mechanical rolling and milling stages so as to separate aluminum oxide dust from aluminum concentrates. The aluminum concentrates may be utilized in conventional furnace recovery methods to produce aluminum ingot or may be further processed through selected stages to produce high quality aluminum pellets. Cromwell suggests that his method may be used with advantage for dross which has been partially prepared by known processes such as rapid cooling to reduce oxidation and thermite reaction losses.

Weiss, in U.S. Pat. No. 4,394,978, is more concerned with conditioning of the dross prior to separation and metal recovery. He cools the dross in a controlled atmosphere so as to minimize oxidation losses and to produce granules which are then ground and screened to remove dust and to improve the yield of metallic aluminum.

Roth, U.S. Pat. No. 4,386,956, in a more direct approach to metal recovery, "squeezes" or compresses hot dross using a wedge-shaped plunger or ram in a tray of matching shape. Some free aluminum drains through holes in the tray when it is filled. Compression and compaction of the dross causes additional aluminum to flow through the openings, and, during compression, the heat sink effect of the tool (wedge and tray) quickly cools the dross so as to diminish aluminum metal losses due to thermite and oxidation reactions. The compression aids in quick solidification of the dross and pooling of large regions of metal near the edges or surfaces of the dross material. Compression causes small droplets of aluminum dispersed throughout the dross to coalesce into large plates at the surface of the dross. This free aluminum metal is recovered in subsequent steps by breaking up the bulky dross pieces by passing them through a series of blasters and separators.

Van Linden, in U.S. Pat. No. 4,540,163, in part refines the method of Roth by so shaping the ram and the dross holding tray that, in operation, upward movement of the dross is inhibited, downward movement of the free aluminum is helped, and internal shear forces in the dross are maximized, so as to improve the separation and coalescing of free aluminum metal in the dross.

Although both Roth and Van Linden have the potential for greater total metal recovery by providing immediate or initial metal separation through gravity augmented by compression while the dross is in the receiving tray, they have the disadvantage of being batch operations and of producing solidified dross which is in bulky pieces requiring costly and laborious reduction before further treatment.

SUMMARY OF THE INVENTION

Accordingly, it is an object of this invention to provide a method and an apparatus for receiving a flow of dross and treating it in a continuous process so as to enhance recovery of metallic aluminum remaining in the dross and to facilitate mechanical handling of the solidified dross after initial treatment.

It is also an object of this invention to provide a method and an apparatus to process hot dross as skimmed in a continuous process so as to make possible some direct or immediate recovery of aluminum metal and/or to condition the dross so as to facilitate later recovery of aluminum metal remaining in the dross.

Another object of this invention is to improve the efficiency of collection of metallic aluminum freed from hot dross in a compression and compaction process by providing a collection cavity in a dross compressing tool and passages between the cavity and tool surface so that freed aluminum may enter the cavity.

According to one aspect of this invention, hot dross is delivered to the bite or pinch point between a pair of contra-rotating rolls, operable to draw the dross through the rolls and compress and compact it. The pressure and compaction of the rolling action causes free aluminum present in the dross to coalesce, aiding subsequent recovery, and also produces a sheet of material readily broken into smaller pieces for easier subsequent handling.

In a particular embodiment, cooling means associated with the rolls, for example, internal cooling of the rolls, rapidly cools the dross so as to minimize oxidation and thermite reaction. Raised elements on the rolls, such as circumferential ribs may begin the dividing or fracturing of the dross sheet delivered by the rolls in preparation for subsequent handling.

In another embodiment, also including cooling means associated with the rolls, cooling is controlled so that at least some of the free molten aluminum present in the dross, may decant from the dross and be collected adjacent the rolls.

In another variation, in which more emphasis is placed on immediate metal recovery, heat is supplied to the dross at the rolls, for example by means internal to the rolls, and the roll arrangement and roll structure are configured to assist in channeling and diverting molten aluminum for collection. The rolls may include inset surface grooves for leading molten material towards the ends of the rolls, free of the compacted dross. Diversion and collection may be assisted by providing an internal cavity in the roll, connected to the roll surface by generally radial passages, so that molten aluminum freed from the dross and tending to pool at the bite between the rolls may be forced through the passages into the cavity. This molten aluminum is then drained from the cavity on the downstream side of the bite between the rolls.

A feature and an advantage of this invention are that hot dross is processed into a conveniently manageable condition for subsequent handling, both in terms of portion (patty) size and of the internal structure (coalesced aluminum metal) of the delivered product. The continuous nature of the process facilitates management of the temperature of the received dross in conditioning it for particular immediate objectives as well as for subsequent handling.

DESCRIPTION OF THE PREFERRED EMBODIMENTS

Figure 1:
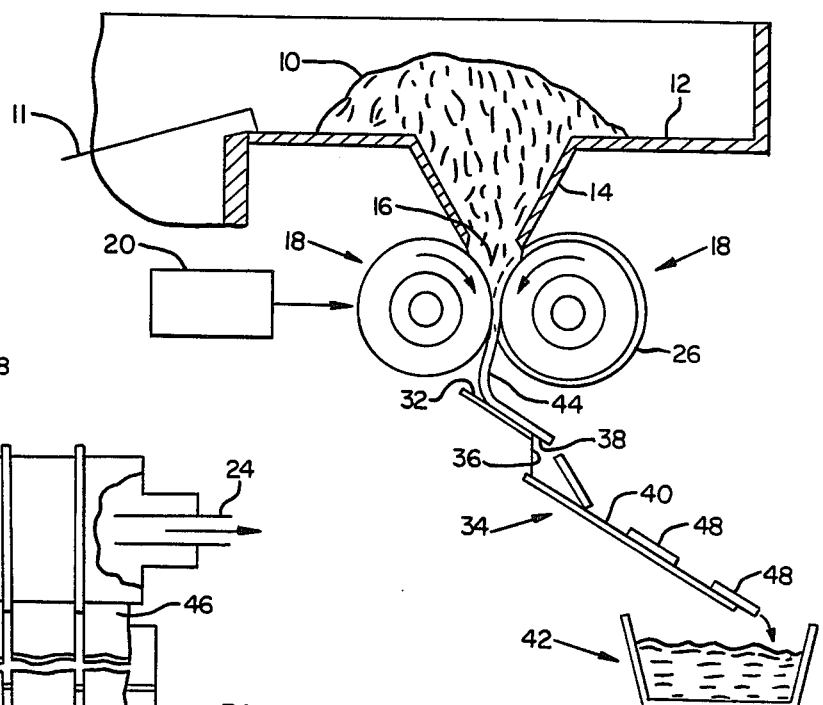
FIG. 1 is a schematic side elevation of a dross processing arrangement according to the invention.
Figure 2:
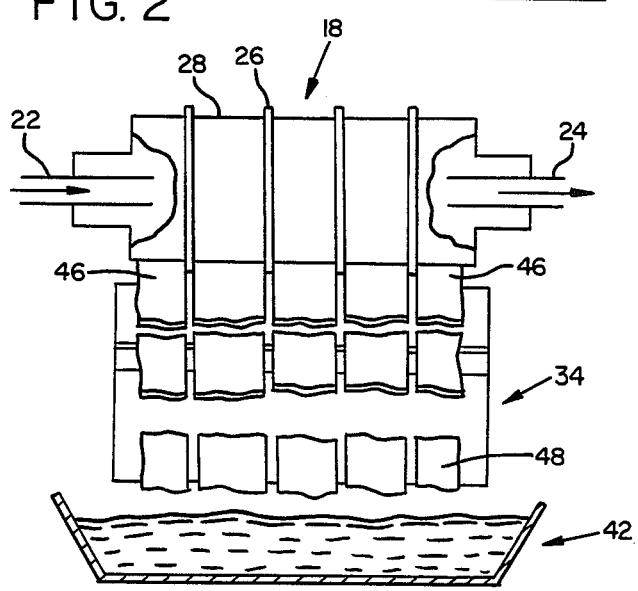
FIG. 2 is a partial schematic front view of the arrangement of FIG. 1.

The invention is embodied in the dross receiving and processing arrangement shown schematically in FIGS. 1 and 2. Dross 10 from a furnace (not shown) passes by way of a dross or skim ramp 11, to a holding deck 12. An elongated tapering feed hopper 14 funnels the dross downwards to the bite or pinch point 16 between a pair of contra-rotating closely spaced rolls 18. Separation of the rolls is limited at a constant force provided by a conventional hydraulic control mechanism 20. Internal passages, not shown, permit liquid cooling of the rolls 18, the cooling medium entering and leaving through inlets and outlets 22, 24, respectively, see FIG. 2. One of the rolls 18 carries a set of longitudinally spaced circumferentially extending ribs 26, raised above the roll surface 28.

The rolls 18 deliver downwards to the receiving portion 32 of a break chute 34. The downwardly inclined receiving portion 32 ends in a vertical step or wall 36, the junction of the two defining a break edge 38. The break chute 34 continues downwards with an extended delivery portion 40 which discharges into a trough or bin 42.

In operation, dross feed rate, roll cooling rate and roll pressure are controlled so that a coherent sheet 44 of partially solidified metal concentrate and compacted oxide particles exits the rolls 18. Preferably, for maximum coalescing and separation of aluminum metal, the pressure on the dross between the rolls 18 is maintained, by the pressure control mechanism 20, above a "threshold pressure", determined empirically and depending at least in part on the amount of free aluminum metal in the dross.

The dross sheet 44 leaves the rolls 18 divided into longitudinal strips 46, (FIG. 2) due to the fracturing or rupturing effect of the ribs 26 biting into the sheet 44 as the rolls 18 rotate under pressure. The ribs 26 are shown on only one roll 18 but could be present on both, if desired. The ribs 26 formed on one roll 18 could also be matched by grooves formed on the mating roll.

The strips 46 emerging from the rolls 18 are still somewhat "mushy" but the compressive or squeezing action of the rolls 18 has solidified the outer regions of the dross sheet 44 sufficiently to give the sheet 44 structural integrity. The strips 46 are fractured laterally into patties 48 of cooled compressed furnace dross by the action of the break chute 34. The first opportunity for a lateral fracture occurs when the strips 46 are deflected and bent by the receiving portion 32 of the chute. A second opportunity occurs when the patties 48 or portions of the strips 46 overhang the break edge 38 where additional fracturing may occur under the material's own weight when there is sufficient overhang.

After collection in the bin 42, the dross patties 48 may completely solidify, for example during transport to an impact mill where the product can be separated into a first fraction of mostly metallic aluminum particles (metal concentrate) and a second much finer fraction of mostly oxides. A mostly metal-free dust fraction may be collected in a bag house. The metal concentrate may be fed into any suitable re-melt facility such as a rotary salt furnace. The relatively uniform dimensions of the dross patties 48 produced by this process also make them very suitable for charging directly into the pumpless vortex bay of a continuous re-melt facility.

When dross is cooled by slow conventional methods, much aluminum metal in the dross is lost due to oxidation in general and a thermite reaction (exothermic oxidation of aluminum metal) in particular. The rapid cooling by the cooled rolls 18 of the present embodiment much reduces these losses. Its use is especially appropriate when the cooled product is to be held or stored temporarily before going to the next treatment step.

In the "raw" dross, molten aluminum metal is separated by oxide films and gas bubbles, but the cooled squeeze rolls 18 force coalescence of molten metal and thus produce a feed stock with high metal recovery, uniquely suited for the vortex bowl remelt process. Recovery rates are typically 60 to 80% of the entrained metal compared with recovery rates of 35 to 55% for dross of comparable composition cooled by conventional means.

Considered as a by-product, the dross patties 48 have considerable potential advantage in the secondary aluminum industry and steel making processes due to the uniformity and high remaining metallic content of the product. The balanced combined action of hot squeezing (forcing coalescing or pooling of large regions of aluminum metal near the edges or surfaces of the dross), and cooling (for solidification of coalesced metal) of this squeeze roll process creates a sheet-like product 44 easily broken up mechanically into a metal concentrate fraction and a fraction containing mostly oxides.

The process is perhaps most suited for continuous melting complexes but can be used for any form or condition of dross whether rich, poor, cool or "on fire". The process is also well suited for batch furnace operations where large amounts of skim have to be processed in a short time. The equipment can be mounted on a furnace tending machine or "off site".

Figure 3:
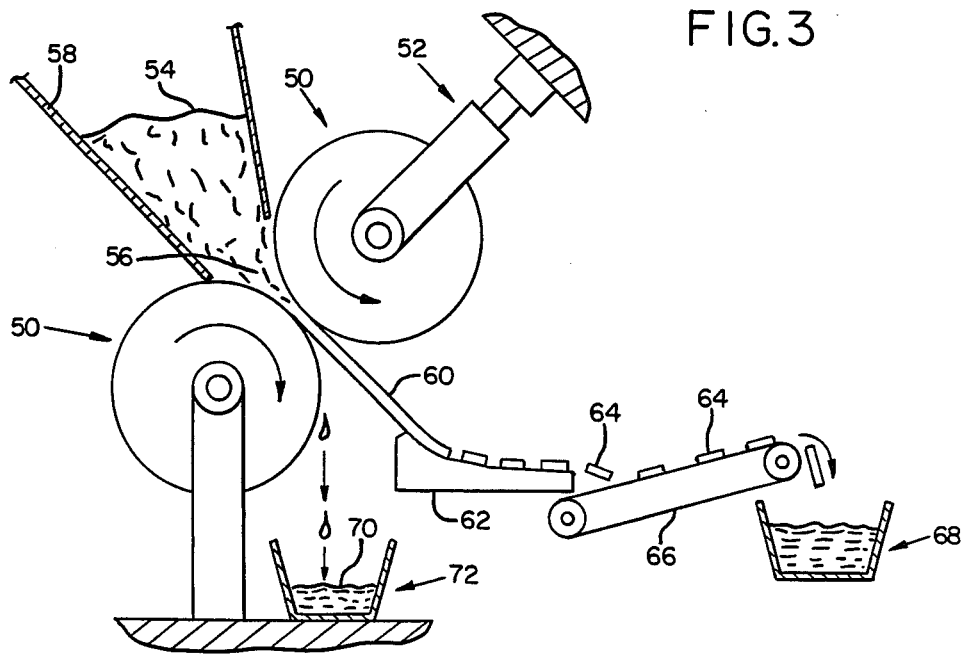
FIG. 3 is a schematic side elevation of an alternative dross processing arrangement.

In the embodiment of FIG. 3, one of the rolls 50 is raised above the other so that their direction of feeding is inclined from the vertical. The upper roll 50 is controlled through its support 52 to maintain constant pressure on the material between the rolls. A flow of dross 54 is funneled to the bite 56 between the rolls 50 by a dross chute 58. The emerging inclined dross sheet 60 encounters a dross sheet receiver 62 which deflects the oncoming sheet 60, bending it sufficiently to rupture it into small pieces or patties 64. The patties 64 are then carried away by a conveyor 66 to a trough or bin 68. The process and product are very similar to that of the first embodiment, but here the cooling of the rolls 50 is regulated and limited, postponing solidification of free aluminum metal released by the compression of the dross 54 so that at least a portion of the molten metal 70 may be squeezed "away" from the semi-solid dross sheet 60 to fall and be collected in a metal receiver 72. The tilted alignment of the rolls 50 and consequent inclination of the emerging semi-solid dross sheet 60 facilitates the separation of the molten aluminum 70 from the dross sheet 60 as it is guided away to be broken up for further treatment.

Figure 4:
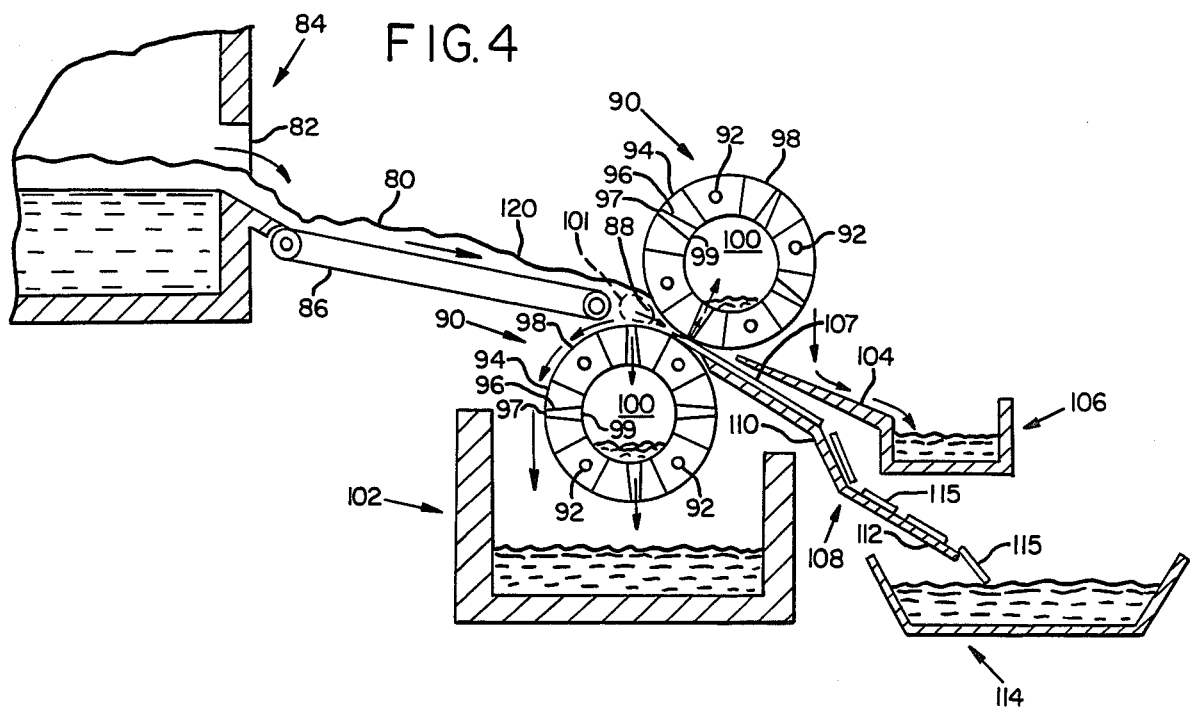
FIG. 4 is schematic side elevation of a third embodiment of the invention.
Figure 5:
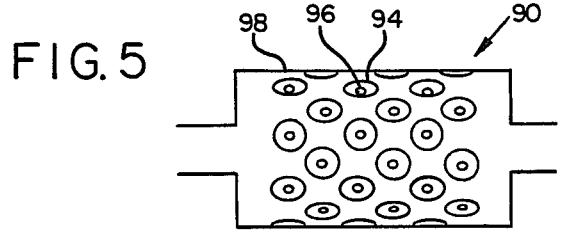
FIG. 5 is a front view of one of the rolls of the embodiment of FIG. 4.

In a third embodiment, illustrated in FIGS. 4 and 5, dross 80 is removed through an outlet 82 of a furnace 84, and carried by a conveyor 86 to the bite 88 between a pair of rolls 90. Means, not shown, are providedd for controlling roll pressure. In this embodiment, the rolls 90 are heated by conventional means such as electrical elements 92 so as to maintain the temperature of the dross 80 and prevent premature solidification at the roll surface. This maximizes the immediate recovery of aluminum metal. The rolls 90 are hollow and a plurality of inserts 94 provides radial passages 96 from the roll outside surface 98 to an internal cavity 100.

In the operation of the embodiment of FIG. 4, the rolls 90 compress the hot dross 80 and free molten metal trapped within it. The aluminum metal coalesces and separates out along the roll faces 98 in the area of the bite 88. The separated metal builds up ahead of the rolls 90, as indicated schematically at 101 in FIG. 4, and some of it is recovered as it falls down in front of the lower roll 90 to be collected in a lower metal receiver 102. Another portion of the metal enters the lower roll 90 through the passages 96 flowing into the cavity 100 and emerging from other passages 96 in the lower portion of the roll 90 as it rotates and as indicated in FIG. 4. A further portion of the molten aluminum is forced by the pressure buildup at the bite 88 between the rolls 90 to enter the radial passages 96 in the upper roll 90 and pass into its internal cavity 100. The tilted alignment of the rolls 90 is such that this material can emerge, by way of one or more of the passages 96, from the upper roll 90 downstream of the bite 88. The material is then diverted and guided by a ramp 104 into an upper metal receiver 106. To discriminate between molten metal and the solids network portion of the dross 80, the diameter of the inlet 97 to each passage 96 may be of the order of ½"

to ¾" diameter and preferably tapered to a wider outlet 99 into the cavity 100, so as to minimize the likelihood of blocking the passageway 96. The tilting of the rolls 90 aids in the feeding of the dross 80 to the bite 88 as well as in metal recovery. The possibility for molten aluminum to enter and be recovered from the cavity 100 of the upper roll 90 increases the efficiency of recovery from the system.

The compressed, compacted and drained dross 80 leaves the rolls 90 in a thin hot sheet 107, and is guided downwards away from the rolls 90, by a dross chute 108. The chute 108 includes a break edge 110 and a delivery portion 112 which finally delivers the dross 80 to a bin 114. The dross sheet 107 breaks easily into convenient sized pieces 115 for further processing or final disposal.

The hot roll process which provides maximum immediate metal recovery, may be used to advantage, for example, to supply treated dross as feed stock in a continuous metal recovery process with continuous feed, as in a rotary salt kiln. When the hot compacted dross is fed directly into the kiln, losses and energy use can be minimized.

Figure 6:
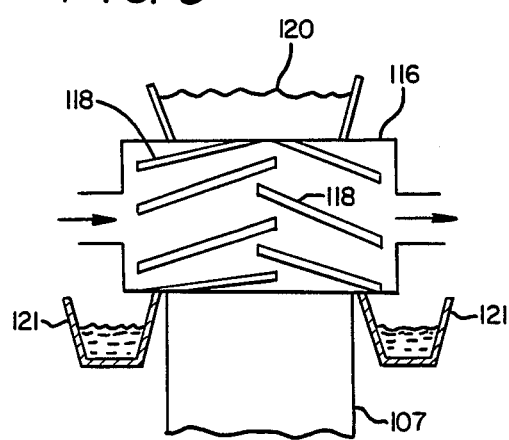
FIGS. 6 and 7 are schematic partial overhead views of the embodiment of FIG. 4 but with alternative roll designs.
Figure 7:
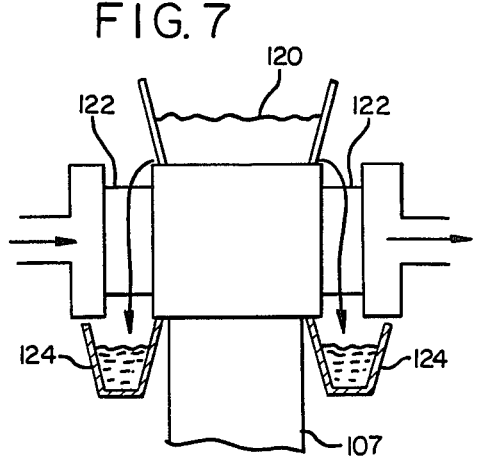

FIGS. 6 and 7 illustrate alternative roll designs for use in the hot roll process of the FIG. 4 embodiment. In the roll of FIG. 6, a cylindrical roll surface 116 carries a series of open grooves 118, each groove 118 extending approximately helically from close to the center of the roll and terminating close to the roll ends. The width of the grooves 118, for example about ½", is large enough to permit the entry of molten aluminum metal but small enough to inhibit the entry of the solids network material. The grooves 118 extend beyond the lateral sides of a band of dross 120 being delivered to the rolls, and of the dross sheet 107 emerging from the rolls so that molten aluminum expressed from the dross between the rolls may be conducted by the grooves 118 towards the end of the rolls and be released. This dross is then collected by some suitable means such as by channels or troughs 121.

In the alternative roll design of FIG. 7, also for use in the embodiment of FIG. 4, recovery of freed molten aluminum is facilitated by the provision of annular grooves 122 formed adjacent to the ends of the roll. The grooves 122 can direct freed molten metal into a suitable collection means, such as channels or troughs 124. Although not shown, the annular groove design may be used in conjunction with the helical surface grooves 118 of FIG. 6, wherein the helical grooves 118 are open-ended and arranged to deliver molten metal directly into the annular grooves 122. In another advantageous arrangement, also not shown, helical surface grooves may be used to feed into radial passages of the type (96) included in the rolls 90 of the embodiment of FIG. 4 so as to improve efficiency of collection of freed molten aluminum.

While the invention has been described in conjunction with several specific embodiments, it is to be understood that many alternatives, modifications and variations will be apparent to those skilled in the art in light of the aforegoing description. Accordingly, this invention is intended to embrace all such alternatives, modifications, and variations which fall within the spirit and scope of the appended claims.

We claim:

1. A press for treating hot aluminum dross which forms on the surface of molten aluminum during aluminum melting operations, the dross containing molten aluminum metal and a solids network, the press comprising:
- a pair of rolls, each having a generally cylindrical surface, closely spaced and with the longitudinal axes of the cylindrical surfaces parallel, rotatable in opposite directions about their respective longitudinal axes to create a bite between them;
- means for resisting separation of said rolls; and
- means for delivering a flow of dross to said bite so that rotation of said rolls is effective to draw the dross between said rolls, said means for resisting separation of said rolls including means for maintaining a predetermined pressure on the dross between said rolls so that they compress the dross with a pressure above a threshold pressure sufficient to pool molten aluminum metal within the dross and to compact the dross and deliver it downstream of said rolls in a semi-solid sheet.

2. The press of claim 1 further including guide means for receiving and deflecting said semi-solid sheet so as to rupture it at intervals spaced along said sheet along lines of rupture approximately transverse to said sheet.

3. The press of claim 1 further including means associated with said rolls for cooling the dross.

4. The press of claim 1 further including means carried by at least one of said rolls for rupturing said sheet along lines of rupture of longitudinal extent.

5. The press of claim 4 wherein said guide means includes an interrupted surface so that as said sheet advances it becomes unsupported, and the unsupported portion is ruptured from said sheet under the action of gravity.

6. The press of claim 5 further including means for cooling at least one of said rolls so as to accelerate cooling of the compacted dross and solidification of the free aluminum metal.

7. The press of claim 6 further including means for collecting the ruptured sheet portions.

8. The press of claim 4 wherein said means for rupturing said sheet carried by the at least one roll includes at least a pair of spaced circumferentially extending ribs carried by the surface of the roll.

9. The press of claim 1 wherein the longitudinal axes of said rolls lie in approximately the same horizontal plane and said means for feeding the dross, feeds the dross to said rolls in a generally downward direction.

10. The press of claim 1 wherein said rolls include upper and lower rolls disposed one above the other and said means for feeding the dross feeds the dross to said rolls in a generally horizontal direction.

11. The press of claim 10 wherein the longitudinal axis of said upper roll is displaced horizontally in a generally downstream direction, with respect to the longitudinal axis of said lower roll so that a common tangent between said rolls is directed generally downwards.

12. The press of claim 11 wherein, by virtue of their relative dispositions, said rolls are operable to deliver a sheet of compacted dross in the generally downward direction, and further including a receiving bed having a receiving surface generally inclined to the generally downward direction, for intercepting and applying deflecting pressure to said sheet so as to rupture it at intervals along a plurality of rupture lines generally transverse to said sheet.

13. The press of claim 12 further including a conveyor disposed in a receiving relationship with said receiving bed for receiving ruptured sheet portions and conveying them away from the receiving bed.

14. The press of claim 11 further including means for maintaining the temperature of the dross so that at least part of the molten aluminum metal present in the dross is separated from the dross responsive to the pressure of the rolls.

15. The press of claim 14 wherein the temperature of the dross is maintained at least in part by heat exchanging means extending within at least one of said rolls.

16. The press of claim 11 further including means for maintaining the temperature of the dross so that a substantial portion of the aluminum metal within the dross separates from the dross adjacent the bite between the rolls, and further including means for collecting said aluminum metal.

17. The press of claim 11 wherein at least one of said rolls includes means for diverting the aluminum metal for collection, said means being sized and configured to permit the passage of molten aluminum metal while inhibiting the passage of said solids network.

18. The press of claim 17 wherein said means for diverting includes an internal cavity in at least one of said rolls, and a plurality of through passages extending between the cylindrical surface of said roll and its cavity, so that in operation, molten aluminum metal associated with the dross may be diverted from the upstream side to the downstream side of the bite between the rolls by passing through a passage to enter the cavity and passing through a passage to drain from the cavity on the downstream side of said rolls.

19. The press of claim 18 further including collecting means for intercepting and guiding molten aluminum metal emerging from said upper roll on the downstream side of said rolls.

20. The press of claim 19 wherein said collecting means includes a ramp extending outwardly and downwardly from adjacent the bite between said rolls on the downstream side of said rolls.

21. The press of claim 20 wherein said collecting means includes a receptacle for at least temporarily holding aluminum metal.

22. The press of claim 20 further including a guide surface for receiving and guiding the solid sheet downstream of said rolls, said guide surface being disposed below said ramp of said collecting means.

23. The press of claim 17 wherein said means for diverting molten aluminum metal includes a plurality of grooves extending across a portion of the cylindrical surface of at least one of said rolls, said grooves being arranged to conduct molten aluminum metal from positions intermediate the ends of said rolls for release towards the ends of said rolls, and said grooves being sized and configured to permit the passage of molten aluminum metal but inhibit the passage of said solids network.

24. The press of claim 23 wherein said grooves extend generally helically in the surface of at least one of said rolls.

25. The press of claim 23 wherein said means for diverting further includes a cavity formed within at least one of said rolls and a plurality of through passages communicating between the cylindrical surface of said roll and said cavity.

26. The press of claim 23 wherein said means for diverting further includes at least one annular groove formed in the cylindrical surface adjacent to an end of at least one of said rolls.

27. The press of claim 23 wherein said means for diverting includes at least one receptacle for collecting diverted aluminum metal.

28. The press of claim 11 further including an annular groove formed adjacent to an end of the cylindrical surface of at least one of said rolls for intercepting and controlling the flow of aluminum metal expelled from the dross.

29. In a press for recovering aluminum metal from hot aluminum dross which forms on the surface of molten aluminum during melting operations, said dross containing molten aluminum metal and a solids network, a compression tool for receiving and compacting a flow of dross by applying a compressive force on said dross such that a substantial portion of said aluminum separates from said dross, said compression tool comprising:
 a body having an outer surface;
 a cavity within the body; and
 a plurality of through passages connecting the surface to the cavity for conducting molten aluminum metal from the surface into the cavity.

30. The press of claim 29 wherein said body is cylindrical.

31. A method for treating hot aluminum dross which forms on the surface of molten aluminum during aluminum melting operations, the dross containing molten aluminum metal and a solids network, comprising the steps of:
 delivering a flow of dross to the bite defined by a pair of closely spaced parallel cylindrical rolls;
 rotating said rolls so as to draw the dross between them; and
 restraining said rolls so as to maintain a predetermined pressure on the dross between said rolls and compress the dross with a pressure above a threshold pressure sufficient to pool aluminum metal within the dross and to compact the dross and deliver it downstream of said rolls in a semi-solid sheet.

32. The method of claim 31 including the additional step of controlling the temperature of said rolls so as to maintain the dross adjacent said rolls in a predetermined condition.

33. The method of claim 32 wherein the step of controlling the temperature of said rolls includes heating said rolls so that at least part of the molten aluminum metal present in the dross is separated from the dross responsive to the pressure of said rolls.

34. The method of claim 31 including the additional step of diverting molten aluminum metal from said rolls and collecting said aluminum metal.

35. The method of claim 34 including the additional step of maintaining grooves in the surface of at least one of said rolls for conducting molten aluminum metal towards an end of said roll.

36. The method of claim 34 including the additional step of maintaining passages in at least one of said rolls, and permitting molten aluminum to enter said roll through said passages upstream of said bite between said rolls and emerge from said passages downstream of said bite.

37. The method of claim 36 including the additional step of intercepting and guiding molten aluminum metal emerging from said roll on the downstream side of said bite.

38. The method of claim 31 including the additional step of intercepting and deflecting the dross sheet downstream of said rolls so as to break the sheet into discrete pieces.

39. The method of claim 38 including the additional steps of receiving said discrete pieces and conveying them away for further treatment.

40. The method of claim 31 including the additional step of dividing the sheet longitudinally as it passes through the rolls.

* * * * *